United States Patent
Sadasivan et al.

(10) Patent No.: US 11,639,268 B2
(45) Date of Patent: May 2, 2023

(54) AXLE LOCK ASSEMBLY FOR MOTOR DRIVEN ROLLERS

(71) Applicant: Intelligrated Headquarters, LLC, Mason, OH (US)

(72) Inventors: Saravanan Sadasivan, Bangalore (IN); Ravi Kumar Avupati, Bangalore (IN); Venkatesh Raikar, Bangalore (IN); Balaji Krishnaswamy, Bangalore (IN)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/445,868

(22) Filed: Aug. 25, 2021

(65) Prior Publication Data

US 2022/0411192 A1 Dec. 29, 2022

(30) Foreign Application Priority Data

Jun. 23, 2021 (IN) .............................. 202111028100

(51) Int. Cl.
*B65G 13/06* (2006.01)
*B65G 13/11* (2006.01)

(52) U.S. Cl.
CPC .............. *B65G 13/06* (2013.01); *B65G 13/11* (2013.01)

(58) Field of Classification Search
CPC ......... B65G 13/11; B65G 13/12; B65G 13/06
See application file for complete search history.

(56) References Cited

U.S. PATENT DOCUMENTS

| | | | | |
|---|---|---|---|---|
| 4,056,180 A * | 11/1977 | Gunti | ..................... | B65G 13/11 198/860.3 |
| 4,148,386 A * | 4/1979 | Bradbury | ............... | B65G 39/09 193/37 |
| 4,632,575 A * | 12/1986 | Alverth | .................... | B41F 13/30 384/258 |
| 6,302,255 B1 * | 10/2001 | Hollander | .............. | B65G 39/12 193/35 R |
| 6,481,564 B2 * | 11/2002 | Kalm | ..................... | B65G 13/11 198/782 |
| 6,726,003 B2 * | 4/2004 | Itoh | ........................ | B65G 39/12 198/780 |
| 7,243,784 B2 * | 7/2007 | Cotter | .................... | B65G 13/11 193/35 J |
| 7,588,135 B1 | 9/2009 | Chuang | | |

FOREIGN PATENT DOCUMENTS

KR 20-0434309 Y1 12/2006

* cited by examiner

*Primary Examiner* — Mark A Deuble
(74) *Attorney, Agent, or Firm* — Alston & Bird LLP (57) ABSTRACT

Various embodiments illustrated herein disclose an axle lock assembly comprising a first plate with a first aperture, a second plate with a second aperture, a shaft, wherein the shaft is inserted through the first aperture and the second aperture and a bush. When the hushing is in contact with the first plate and the second plate, the bush creates a lateral force to move the first plate and the second plate in opposite directions to secure the shaft.

20 Claims, 11 Drawing Sheets

AXLE LOCK ASSEMBLY FOR MOTOR DRIVEN ROLLERS

CROSS-REFERENCE TO RELATED APPLICATIONS

This application claims priority to and the benefit of foreign Indian Provisional Patent Application Serial No. 202111028100, filed on Jun. 23, 2021 with the Government of India Patent Office and entitled "Axle Lock Assembly For Motor Driven Rollers," each of which is incorporated herein by reference in its entirety.

TECHNOLOGICAL FIELD

Example embodiments of the present invention relates generally to a material handling system for handling items, and, more particularly, to axle locks for use with conveyor systems.

BACKGROUND

Material handling systems are traditionally used to convey, sort, and organize items (e.g., cartons, cases, etc.) at high speeds. Conventional conveyor systems which are used in material handling systems can include a conveyor bed and multiple conveyor carriers such as conveyor rollers or belts supported on a conveyor frame of the conveyor bed. The multiple conveyor carriers are often used for supporting and transporting items within the material handling system. An example conveyor system may include a sorter conveyor system, a merge conveyor system, an accumulation conveyor system, an induction conveyor system, or the like. These conveyor systems are often divided into conveyor zones with each conveyor zone including a set of motorized and/or idler rollers. The set of motorized and/or idler rollers can rotate along one or more roller shafts which are placed on a roller-bed of a conveyor. Operation of the motorized and/or idler rollers can be affected due to relative movement of the one or more roller shafts with respect to the motorized and/or idler rollers.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

As used herein, the terms "drive roller," "motorized roller", "MDR", "motorized drive roller" and similar terms may be used interchangeably to refer to a master roller which drives multiple slave rollers in accordance with embodiments of the present disclosure. The master roller may be driven by an internal drive or an external drive. Thus, use of any such terms should not be taken to limit the spirit and scope of embodiments of the present disclosure.

As used herein, the terms "axle portion", "axle" and similar terms may be used interchangeably to refer to a non-rotatable portion of a conveyor roller fixedly or non-rotatably connected to the conveyor frame in accordance with embodiments of the present disclosure. Thus, use of any such terms should not be taken to limit the spirit and scope of embodiments of the present disclosure.

Throughout this specification, the term 'conveyor' or 'conveyor system' may be used interchangeably and term 'conveyor' may be taken as an example of either a roller conveyor or a belt conveyor.

Various embodiments disclosed herein provide for an axle lock assembly for roller shafts used in motor-driven rollers (MDRs) used in a conveyor system. The MDRs can be installed on a roller-bed of a conveyor in the conveyor system using roller shafts. The roller shafts can be aligned in line with the side-rails of the conveyor and can project out of apertures present in side-rails on either side of conveyor frame. The roller shafts can be held in place to avoid rotation of the roller shafts when the MDRs are in operation using the axle lock assembly. The axle lock assembly can comprise a first plate having a first aperture, a second plate having a second aperture, and a bushing. A shaft can be inserted through the first aperture and the second aperture. The bushing can be in contact with the first plate and the second plate and can create a lateral force to move the first plate and the second plate in opposite directions to secure the shaft. The use of the axle lock assembly can effectively hold the roller shafts of the MDRs firmly in place allowing smooth operation of the MDRs.

In some embodiments, the first plate and the second plate can each comprise guiding features to properly position the bushing such that the bushing secures the first plate and the second plate together. In yet some other embodiments, the guiding features in each of the first plate and the second plate can be grooves or cut-outs which can accommodate the bushing. In yet some other embodiments, the bushing can be configured to attach with the first plate and the second plate such that the first plate, the second plate, and the bushing share a common plane.

In some embodiments, the bushing can be conical in shape. Each of the first plate and the second plate can comprise conical cut-outs or grooves to accommodate the conical bushing. In yet some other embodiments, the bushing can further comprise a flange to provide additional support in holding the first plate and the second plate together. In yet some other embodiments, the first plate can be a top plate and the second plate can be a base plate of the axle lock assembly.

In some embodiments, the shaft inserted through the first aperture of the first plate and the second aperture of the second plate can be a hexagonal shaft. In yet some other embodiments, the shaft can comprise any other geometrical shape.

Figure 1:
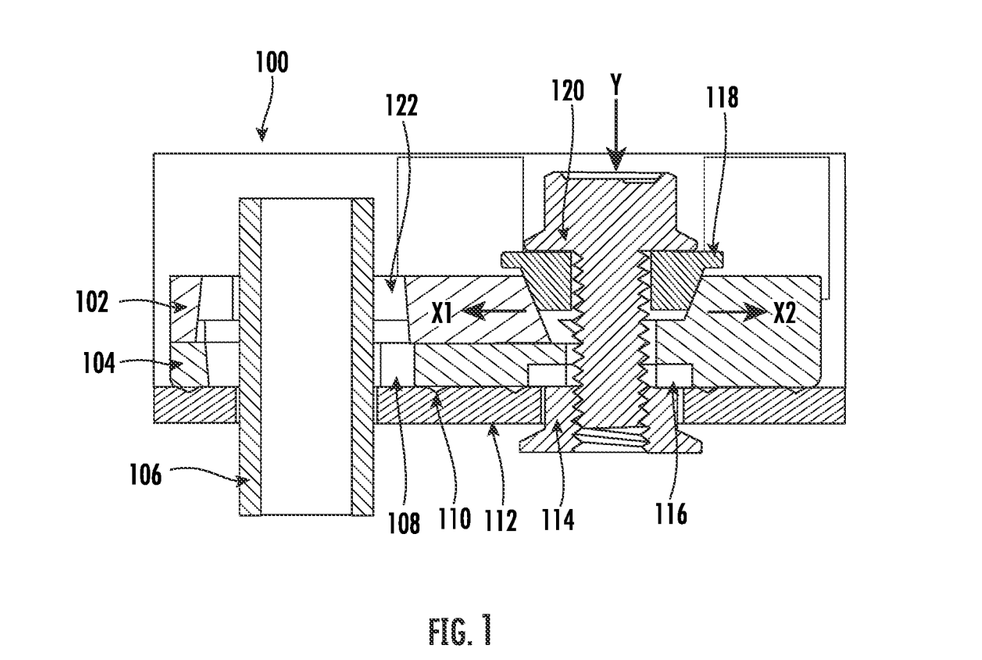
FIG. 1 illustrates a cross-sectional view of an axle lock assembly, according to a first embodiment described herein.

FIG. 1 illustrates a cross-sectional view of an axle lock assembly 100, according to a first embodiment described herein. The axle lock assembly 100 can comprise a first plate 102, a second plate 104, a hexagonal shaft 106, and a bush 118. The bush 118 can be configured to be in contact with the first plate 102 and the second plate 104 such that the bush 118, the first plate 102, and the second plate 104 form a common surface. Further, the first plate 102 and the second plate 104 can comprise one or more grooves such that the bush 118 can be pushed downward and accommodated between the first plate 102 and the second plate 104. In some embodiments, the bush 118 can be conical in shape and one or more conical grooves can be present in the first plate 102 and the second plate 104 to accommodate the conical bush 118. In yet some other embodiments, the bush 118 can comprise any other geometrical shape. The bush 118 can further comprise an aperture through which a bolt 120 can be inserted. The bolt 120 along with a nut 114 can be used to fixedly attach the axle lock assembly 100 to a base plate 112 present in a side-rail of a conveyor frame. In some embodiments, the bolt 120 can be a threaded bolt. In yet some embodiments, a conical grove can be present in the first plate 102 and a semi-conical groove can be present in the second plate 104.

In some embodiments, a front surface of the second plate 104 can further comprise a semi-circular cavity to position the bush 118. Further, one or more portions of the front surface of the second plate 104 can be removed such that the first plate 102 can be positioned in the removed one or more portions of the front surface of the second plate 104. A front surface of the first plate 102 can also comprise a semi-circular cavity to position the bush 118, such that the bush 118 is sandwiched between the first plate 102 and the second plate 104.

The first plate 102 and the second plate 104 can further comprise a first aperture and a second aperture using which a roller shaft 106 can pass through. In some embodiments, a first insert 122 and a second insert 108 can further be inserted in the first aperture of the first plate 102 and the second aperture of the second plate 104 respectively. The first insert 112 and the second insert 108 can each comprise an opening through which the roller shaft 106 can be inserted to pass through the first plate 102 and the second plate 104.

In some embodiments, the first aperture, the second aperture, the first insert 122, and the second insert 108 can be square in shape. In yet some other embodiments, the shape of the first aperture, the second aperture, the first insert 122, and the second insert 108 can comprise any other geometrical shape.

In some embodiments, a cross-section of the roller shaft 106 to be inserted, a first opening in the first insert 112 and a second opening in the second insert 108 through which the roller shaft 106 is to be inserted can be hexagonal in shape, such that the hexagonal roller shaft 106 is in one of a flats-up configuration in which a flat edge of the hexagonal roller shaft 106 is facing upwards, or a points-up configuration in which a corner of the hexagonal roller shaft 106 is facing upwards. The first insert 112 and the second insert 108 can be rotated at a right angle to switch between the flats-up configuration and the points-up configuration. In some other embodiments, the cross-section of the roller shaft 106 can comprise any other geometrical shape.

In some embodiments, the first insert 112 and the second insert 108 can be identical in shape and dimension. In yet some other embodiments, the first insert 112 and the second insert 108 can comprise different shapes and dimension.

In some embodiments, the opening in the first insert 122 and the second insert 108 can be similar in shape as a cross-section of the roller shaft 106. In yet some other embodiments, the opening in the first insert 122 and the second insert 108 can comprise a shape different from the cross-section of the roller-shaft 106.

In some embodiments, the first insert 122 and the second insert 108 can be inserted into the first plate 102 and the second plate 104 at an angle to each other ensure that the first insert 122 and the second insert 108 are fixedly positioned in the first plate 102 and the second plate 104.

As shown in FIG. 1, the bolt 120 can be driven in the Y direction into the nut 114 to attach the axle lock assembly 100 to the base plate 112. The bolt 120 can be driven through the aperture in the bush 118 such that the bush 118 is driven towards the axle lock assembly 100 in the Y direction along with the bolt 120 which is driven into the nut 114. As the bush 118 is being driven in the Y direction along with the bolt 120, the bush 118 can be configured such that the first plate 102 is in contact with a portion of a lateral face of the bush 118 and the second plate 104 is in contact with another portion of the lateral face of the bush 118. Due to movement of the bush 118 in the Y direction, a first lateral force is generated which can move the first plate 102 from right to left (as indicated by X1 direction) and a second lateral force is generated which can move the second plate 104 from left to right (as indicated by X2 direction). The roller shaft 106, which is in contact with the first plate 102 and the second plate 104 in turn experiences the first lateral force generated in the X1 direction and the second lateral force generated in the X2 direction respectively. As the first lateral force and the second lateral force experienced by the roller shaft 106 are equal in magnitude and opposite in direction, the roller shaft 106 can be held securely in position such that the roller shaft 106 experiences no relative movement when an MDR mounted on the roller shaft 106 is in operation.

In some embodiments, the first plate 102 can be the top plate and the second plate 104 can be the bottom plate of the axle lock assembly 100.

In some embodiments, a plurality of projections such as 110 can be present in the second plate 104. The plurality of projections such as 110 can come in contact with the base plate 112 of the side-rail of the conveyor frame and grip the base plate 112 such that the axle lock assembly 100 is fixedly attached to the base plate 112 of the side-rail of the conveyor frame.

In some embodiments, the second plate 104 can comprise a cavity to insert a magnet 116. The magnet 116 can be used to fixedly position the axle lock assembly 100 to the base plate 112 using magnetic force of the magnet 116. In yet some other embodiments, a position at which the nut 114 can be driven into the bolt 120 can be determined using the magnetic force of the magnet 116.

Figure 2:
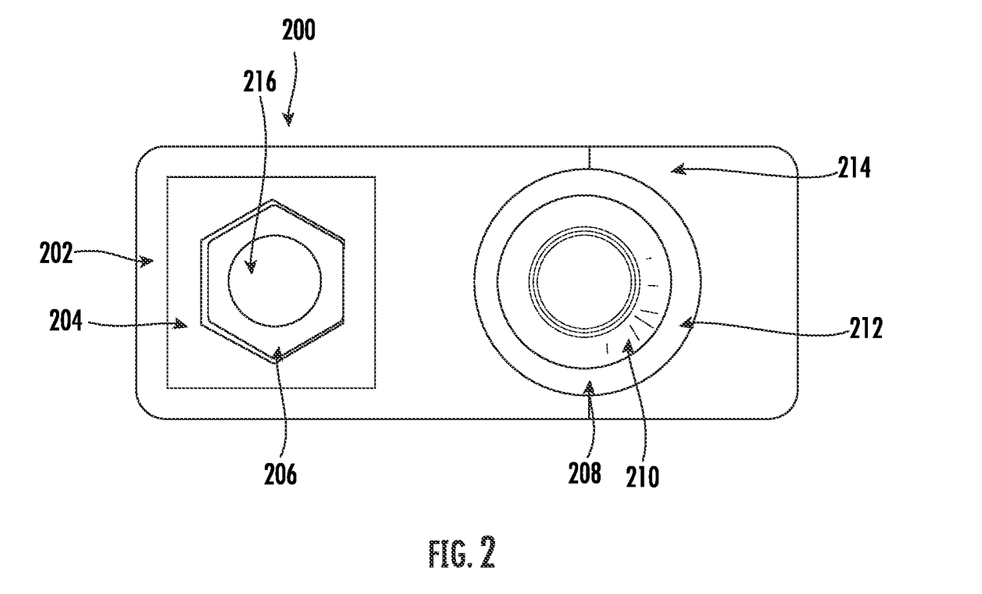
FIG. 2 illustrates a top view of the axle lock assembly, according to a first embodiment described herein.

FIG. 2 illustrates a top view of an axle lock assembly 200, according to a first embodiment described herein. The axle lock assembly 200 can comprise a first plate 202, a second plate 214, and a bush 208. The bush 208 can comprise an opening through which a bolt 210 can be driven through an opening in the first plate 202 and an opening in the second plate 214. The bush 208 can further comprise a flange 212 to align the first plate 202 and the second plate 214 in place. The first plate 202 can comprise a first square insert 204 having a hexagonal-shaped opening 216 in a center position of the first square insert 204. Similarly, the second plate 214 can comprise a second square insert aligned with the first square insert 204 and having a hexagonal-shaped opening in a center position of the second square insert. A hexagonal roller shaft 206 is driven through the hexagonal-shaped opening 216 of the first square insert 204 of the first plate 202 and the hexagonal-shaped opening of the second square insert of the second plate 214.

Figure 3:
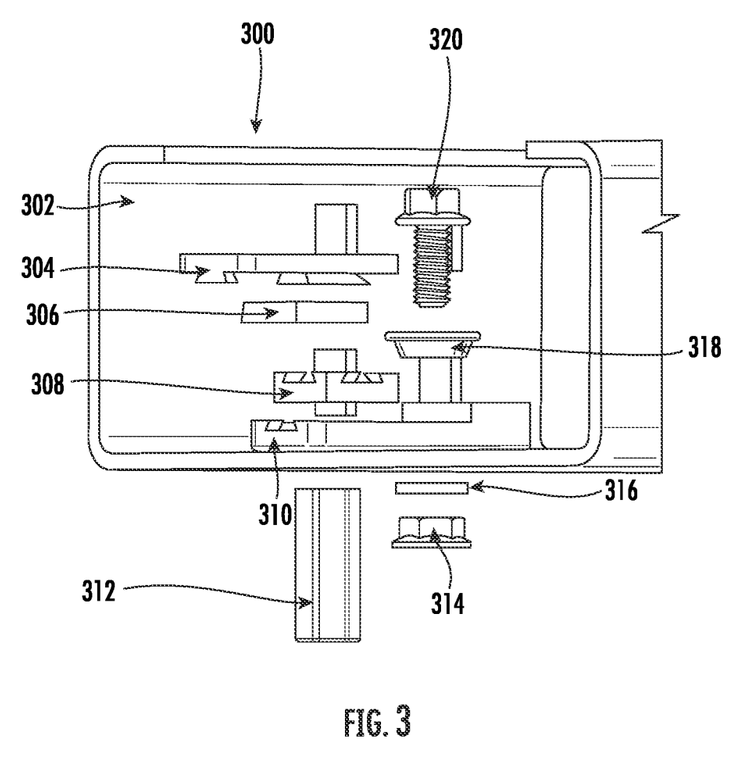
FIG. 3 illustrates an exploded view of one or more components comprising the axle lock assembly, according to a first embodiment described herein.

FIG. 3 illustrates an exploded view of one or more components comprising an axle lock assembly 300 fixedly attached to a side-rail 302 of a conveyor frame. The axle lock assembly 300 can further comprise a first plate 304, a second plate 310, and a bush 318. The first plate 304 and the second plate 310 can each further comprise an opening to fixedly attach a first insert 306 and a second insert 308 respectively. Further, the first insert 306 and the second insert 308 can each comprise an opening through which a roller shaft 312 can be driven through. The bush 318 can comprise an opening through which a threaded bolt 320 can be inserted and secured using a nut 314. The second plate 310 can further comprise a cavity in which a magnet 316 is positioned. The magnet 316 generates a force using which the nut 314 can be secured in a position aligned with the threaded bolt 320.

In some embodiments, the first plate 304 and the second plate 310 can comprise one or more locating features in one or more lateral sides of the first plate 304 and the second plate 310, such that the first plate 304 and the second plate 310 can securely engage with each other.

Figure 4A:
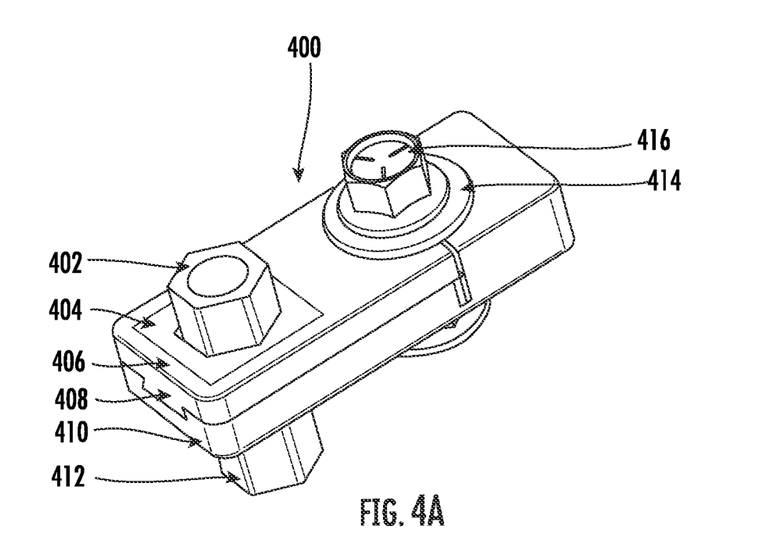
FIGS. 4A and 4B illustrate a top view of a front surface and a back surface of an axle lock assembly, according to a first embodiment described herein.
Figure 4B:
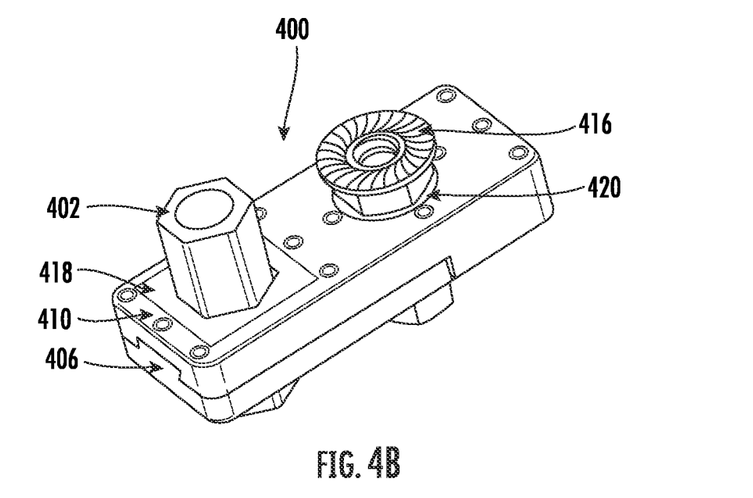

FIGS. 4A and 4B illustrate a top view of a front surface and a back surface of an axle lock assembly 400, according to a first embodiment described herein. The axle lock assembly 400 can comprise a first plate 406, a second plate 410, and a bush 414. The first plate 406 can further comprise one or more slots in which the bush 414 can be accommodated. Similarly, the second plate 410 can further comprise one or more slots to accommodate the bush 414. Further, the bush 414 and the second plate 410 can each comprise a cavity through which a bolt 416 can be driven through. The bush 414 can be driven into the axle lock assembly 400 as the bolt 416 is screwed in to secure the first plate 406 and the second plate 410 of the axle lock assembly 400.

The first plate 406 can comprise an aperture in which a first insert 404 can be fixedly positioned. Similarly, the second plate 410 can comprise an aperture through in which a second insert 418 can be fixedly positioned. The first insert 404 of the first plate 406 and the second insert 418 of the second plate 410 can each comprise a first cavity and a second cavity respectively such that a roller shaft 402 can pass through the first cavity of the first insert 404 and the second cavity of the second insert 418. In some embodiments, the roller shaft 402 can be a hexagonal roller shaft having corners such as 412.

As the bush 414 is driven into the axle lock assembly 400 along with the bolt 416, a first lateral force is generated which can move the first plate 406 from right to left and a second lateral force is generated which can move the second plate 410 from left to right. The roller shaft 412, which is in contact with the first plate 406 and the second plate 410 in turn encounters the first lateral force and the second lateral force respectively. As the first lateral force and the second lateral force experienced by the roller shaft 412 are equal in magnitude and opposite in direction, the roller shaft 412 can be held securely in position. In some embodiments, the first lateral force and the second lateral force act simultaneously.

In some embodiments, the first plate 406 and the second plate 410 can comprise one or more locating features, such as 408, in one or more lateral sides of the first plate 406 and the second plate 410, such that the first plate 406 and the second plate 410 can be attached to each other before the bolt 416 is used to secure the first plate 406 and the second plate 410 of the axle lock assembly 400.

FIGS. 5A-5H illustrate a step-by-step assembly procedure for the axle lock assembly, according to a first embodiment described herein.

Figure 5A:
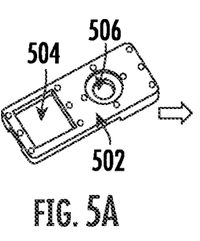
FIGS. 5A-5H illustrate a step-by-step assembly procedure for the axle lock assembly, according to a first embodiment described herein.

FIG. 5A illustrates a first step of the step-by-step assembly procedure for the axle lock assembly. The first step can comprise placing a bottom plate 502 comprising a first aperture 504 and a second aperture 506 on an assembling platform such that a back surface of the bottom plate 504 faces up. The first aperture 504 of the bottom plate 502 can comprise a circular shape and the second aperture 506 of the bottom plate 502 can comprise a square shape. In some embodiments, the first aperture 504 and the second aperture 506 can comprise other geometrical shapes. The bottom plate 502 can further comprise a locating feature, such as a groove or a cavity around the second aperture 506.

Figure 5B:
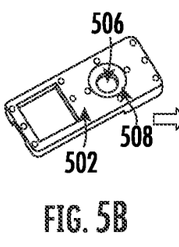

FIG. 5B illustrates a second step of the step-by-step assembly procedure for the axle lock assembly. The second step can comprise placing a magnet 508 in the locating groove or the locating cavity around the second aperture 506.

Figure 5C:
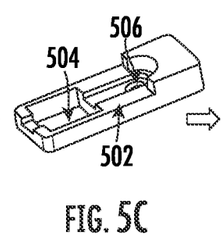

FIG. 5C illustrates a third step of the step-by-step assembly procedure for the axle lock assembly. The third step can comprise switching over the bottom plate 502 such that a front surface of the bottom plate 502 faces up. The front surface of the bottom plate 502 can further comprise a semi-circular cavity to position a conical bush 516 (shown in FIG. 5G). Further, one or more portions of the front surface of the bottom plate 502 can be removed such that a top plate 514 (shown in FIG. 5F) can be positioned in the removed one or more portions of the front surface of the bottom plate 502 such that a front surface of the top plate 514 is adjacent to the front surface of the bottom plate 502.

Figure 5D:
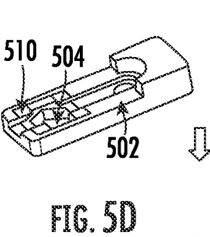

FIG. 5D illustrates a fourth step of the step-by-step assembly procedure for the axle lock assembly. The fourth step can comprise inserting a bottom insert 510 in the first aperture 504. The bottom insert 510 can comprise a similar shape as the first aperture 504 and can further comprise a central cavity which coincides with the first aperture 504.

Figure 5E:
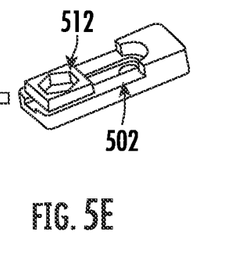

FIG. 5E illustrates a fifth step of the step-by-step assembly procedure for the axle lock assembly. The fifth step can comprise placing a top insert 512 on top of the bottom insert 510 such that the top insert 512 and the bottom insert 510 can be aligned with each other. The top insert 512 can comprise a similar shape as the first aperture 504 and can further comprise a central cavity which coincides with the first aperture 504 and the central cavity of the bottom insert 510.

Figure 5F:
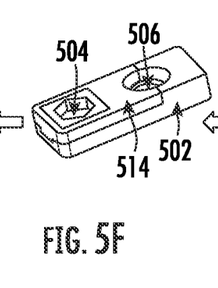

FIG. 5F illustrates a sixth step of the step-by-step assembly procedure for the axle lock assembly. The sixth step can comprise placing a top plate 514 on top of the bottom plate 502. The top plate 514 can comprise an aperture such that the aperture is aligned with the central cavity of the top insert 512, the first aperture 506 of the bottom plate 502, and the central cavity of the bottom insert 510. As described in FIG. 5A, the top plate 514 is positioned in the removed one or more portions of the front surface of the bottom plate 502 such that a front surface of the top plate 514 is adjacent to the front surface of the bottom plate 502. Further, the top plate 514 can comprise a semi-circular cavity to position the conical bush 516 (shown in FIG. 5G).

Figure 5G:
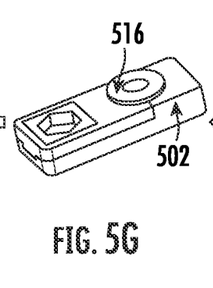

FIG. 5G illustrates a seventh step of the step-by-step assembly procedure for the axle lock assembly. The seventh step can comprise inserting the conical bush 516 between the front surface of the top plate 514 and the front surface of the bottom plate 502 such that conical bush 516 is positioned in the semi-circular cavity of the top plate 514 and the semi-circular cavity of the bottom plate 502. The conical bush 516 can further comprise a central opening through which a bolt 518 (shown in FIG. 5H) can be inserted.

Figure 5H:
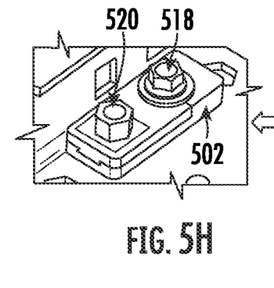

FIG. 5H illustrates an eighth step of the step-by-step assembly procedure for the axle lock assembly. The eighth step can comprise inserting a bolt 518 through the central opening in the conical bush 516 and the second aperture 506 of the bottom plate 502 such that the bolt 518 can fixedly secure the top plate 514, the conical bush 516, and the bottom plate 502 together. The bolt 518 can be fixedly attached to a nut to secure the bolt 518 in place. In some embodiments, the bolt 518 can be a threaded bolt. The eighth step further comprises inserting a roller shaft 520 into a common cavity formed by the top plate 514 comprising an aperture, the central cavity of the top insert 512, the first aperture 506 of the bottom plate 502, and the central cavity of the bottom insert 510.

Figure 6:
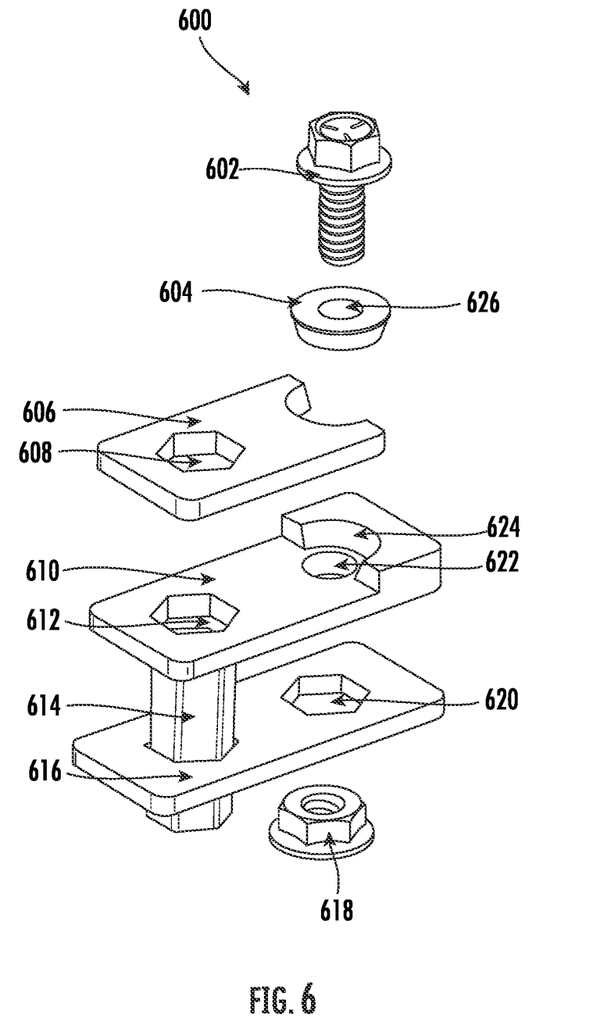
FIG. 6 illustrates an exploded perspective view of a second embodiment of the axle lock assembly described herein.

FIG. 6 illustrates an exploded perspective view of a second embodiment of the axle lock assembly 600 described herein. The axle lock assembly 600 can comprise a first plate 606, a second plate 610, and a bush 604. The bush 604 can comprise a central cavity 626 through which a bolt 602 can be driven. The first plate 606 can further comprise a cavity 608 which can be hexagonal in shape. The second plate 610 can also comprise one or more cavities such as 612, 622, and 624. The cavity 612 can be hexagonal in shape and positioned such that the cavity 608 and the cavity 612 are aligned with each other. The cavities 622 and 624 can be circular and semi-circular in shape respectively. In other embodiments, the cavities 608, 612, 622, and 624 can comprise any other geometrical shape.

In some embodiments, a portion of the second plate 610 can be removed such that the first plate 606 can be placed in the removed portion of the second plate 610. In some embodiments, shape, and dimension of the removed portion of the second plate 610 can be similar to shape and dimension of the first plate 606. In some other embodiments, the shape and dimension of the removed portion of the second plate 610 can be different from the shape and dimension of the first plate 606.

The axle lock assembly 600 can be fixedly attached to a base plate 616 of a conveyor frame. The base plate 616 can further comprise hexagonal cavities such as 620. A hexagonal roller shaft 614 for an MDR can be configured to pass through one of the hexagonal cavities such as 620, the cavity 612 of the second plate 610, and the cavity 608 of the first plate 606. The bolt 602 can then be driven into the cavity 626 of the bush 604 such that the bush 626 experiences a downward force which in turn imparts a first lateral force on the first plate 606 and a second lateral force on the second plate 610. The first lateral force and the second lateral force can be equal in magnitude and opposite in direction from each other, thus securely holding the hexagonal roller shaft 614 firmly in position. In some embodiments, the hexagonal cavities such as 620 can be holes or openings.

Figure 7:
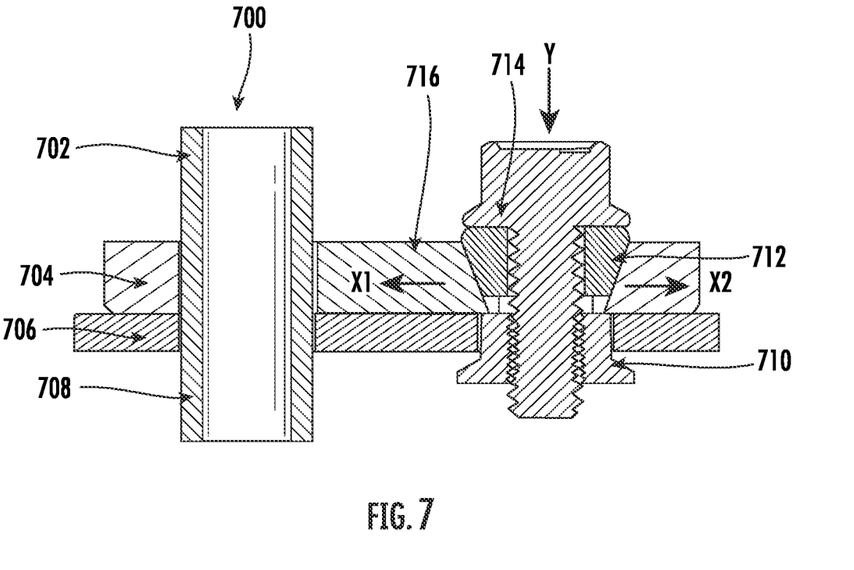
FIG. 7 illustrates an exemplary cross-sectional view of a third embodiment of the axle lock assembly described herein.

FIG. 7 illustrates an exemplary cross-sectional view of a third embodiment of an axle lock assembly 700 described herein. The axle lock assembly 700 can comprise a first plate 704, a second plate 716, and a bush 712. The axle lock assembly can be attached to a base plate 706 of a conveyor frame using a threaded bolt 714. A portion of the first plate 704 can be removed or cut out such that the second plate 716 can be placed in the removed portion of the first plate 704, such that the first plate 704 and the second plate 716 form a single, continuous surface. A first lateral portion of the first plate 704 and a first lateral portion of the second plate 716 can further be shaped such that the bush 712 can be placed between the first plate 704 and the second plate 716.

A second lateral portion of the first plate 704 and a second lateral portion of the second plate 716 can further be shaped such that a roller shaft 702 can be placed between the second lateral portion of the first plate 704 and a second lateral portion of the second plate 716. Further, the base plate 706 can comprise an opening to allow the roller shaft 702 to pass through to the axle lock assembly 700.

The bush 712, the first plate 704, and the base plate 706 can each further comprise an opening such that the threaded bolt 714 can be driven through the bush 712, the first plate 704, and the base plate 706 and secured using a nut 710. The threaded bolt 714 can be screwed in in the Y direction until the bush 712 forms a single, continuous plane with the first plate 704 and the second plate 716. As the bush 712 moves downward in the Y direction, a first lateral force X1 and a second lateral force X2 can be generated. The first lateral force X1 can be generated in the second plate 716 which pushes the roller shaft 702 away from the bush 712. The second lateral force X2 can be generated in the second plate 716 which pulls the roller shaft 702 towards the bush 712. Since X1 and X2 are equal in magnitude and opposite in direction, the roller shaft 702 can be held in a stable position due to a simultaneous action of X1 and X2.

Figure 8:
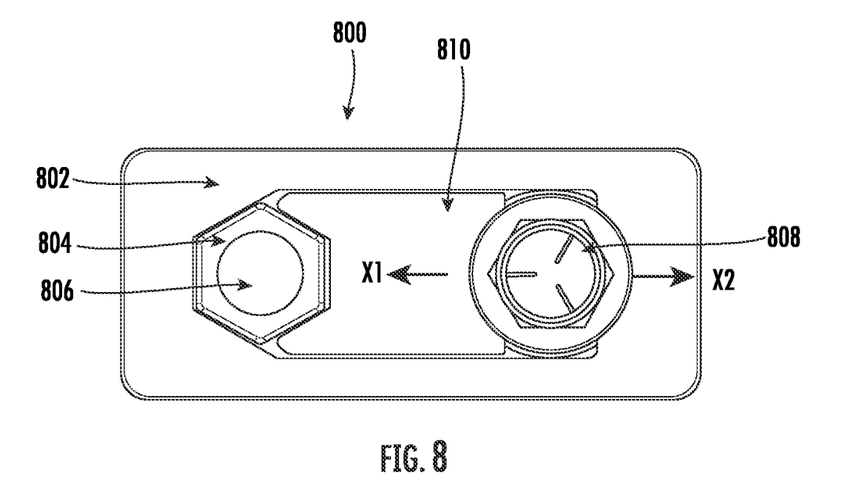
FIG. 8 illustrates an exemplary top view of the third embodiment of the axle lock assembly described herein.

FIG. 8 illustrates an exemplary top view of the third embodiment of an axle lock assembly 800 described herein. A portion of a first plate 802 can be removed such that a second plate 810 can be placed in the removed portion of the first plate 802. A hexagonal roller shaft 804 can be configured to be placed between the first plate 802 and the second plate 810. As a bush 808 is moved towards the first plate 802 and the second plate 810 of the axle lock assembly 800, a first lateral force X1 and a second lateral force X2 can be generated such that X1 and X2 are equal in magnitude and opposite in direction.

Figure 9:
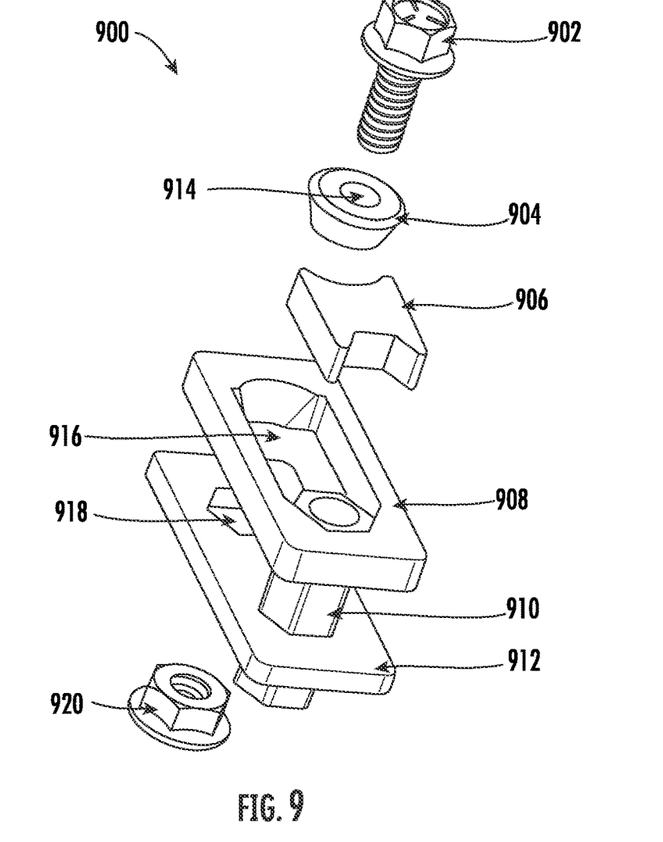
FIG. 9 illustrates an exploded perspective view of the third embodiment of the axle lock assembly described herein.

FIG. 9 illustrates an exploded perspective view of the third embodiment of an axle lock assembly 900 described herein. The axle lock assembly 900 can comprise first plate 906, a second plate 908, and a bush 904. The bush 904 can further comprise an opening 914 wherein a threaded bolt 902 can be inserted and attached to a nut 920. As shown in FIG. 9, the second plate 908 can comprise a central cavity 916. The central cavity 916 of the second plate 908 can comprise a shape such that the first plate 906, the bush 904, and a roller shaft 910 can be accommodated in the central cavity 916. The central cavity 916 can be shaped such that the first plate 906 and the second plate 908 can be present at a common plane forming a continuous flat surface. The axle lock assembly can be attached to a base plate 912 of a conveyor frame. The base plate 912 can comprise a plurality of openings such as 918 through which the roller shaft 910 can be inserted.

Figure 10:
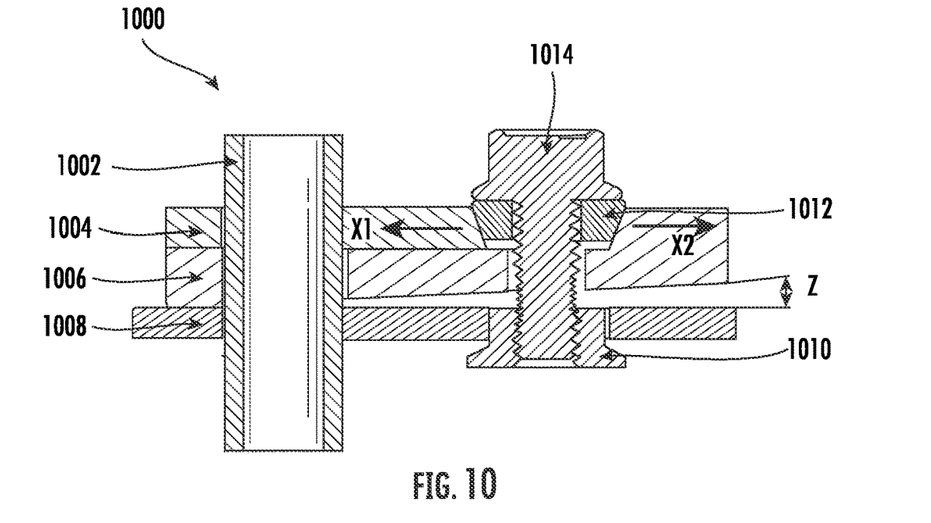
FIG. 10 illustrates an exemplary cross-sectional view of the fourth embodiment of the axle lock assembly described herein.

FIG. 10 illustrates an exemplary cross-sectional view of the axle lock assembly 1000 described herein. The axle lock assembly 1000 can comprise a first plate 1004, a second plate 1006, and a bush 1012. As shown in FIG. 10, by screwing in a bolt 1014 through an aperture in the bush 1012, a downward force can be imparted by the bush 1012 as the bush 1012 is lowered and inserted between the first plate 1004 and the second plate 1006. The axle lock assembly 1000 can be fixedly attached to a base plate 1008. A roller shaft 1002 can be inserted through the base plate 1008, the second plate 1006, and the first plate 1004 through an aperture in each of the base plate 1008, the second plate 1006, and the first plate 1004. In some embodiments, the second plate 1006 can be designed such that a first distance from a top surface to a bottom surface of the second plate 1006 at a first end is greater than a second distance from the top surface to the bottom surface of the second plate 1006 at a second end. Due to a difference between the first distance and the second distance, a gap Z is created between the second plate 1006 and the base plate 1008, as is shown in FIG. 10. Further, due to the difference between the first distance and the second distance, an inclination can be created in the second plate 1006 with respect to the base plate 1008.

A motorized roller can be mounted on the roller shaft 1004. In some embodiments, the motorized roller can be configured to produce torque at different values. In yet some other embodiments, when the torque produced by the motorized roller is high, such as a value higher than 4 Newton meter, the roller shaft 1002 can impart a high holding force on the motorized roller to ensure there is no relative movement between the motorized roller and the roller shaft 1004.

In some embodiments, a vertical force can be generated due to the inclination in the second plate 1006, which can be imparted on the first plate 1004 and the second plate 1006. The vertical force imparted on the first plate 1004 and the second plate 1006 can provide the high holding force on the motorized roller to ensure there is no relative movement between the motorized roller and the roller shaft 1004.

In some embodiments, placing the second plate 1006 at a distance Z from the base plate 1008 can configure the bush 1012 to be inclined with respect to the base plate 1008. Due to the inclination of the bush 1012, a magnitude of a vertical component and a magnitude of a horizontal component of the downward force can be imparted by the bush 1012 can be modified, such that the magnitude of the horizontal component of the downward force is greater than the magnitude of the vertical component. The greater magnitude of the horizontal component can further allow the roller shaft 1002 to impart the high holding force on the motorized roller to ensure there is no relative movement between the motorized roller and the roller shaft 1004.

Figure 11A:
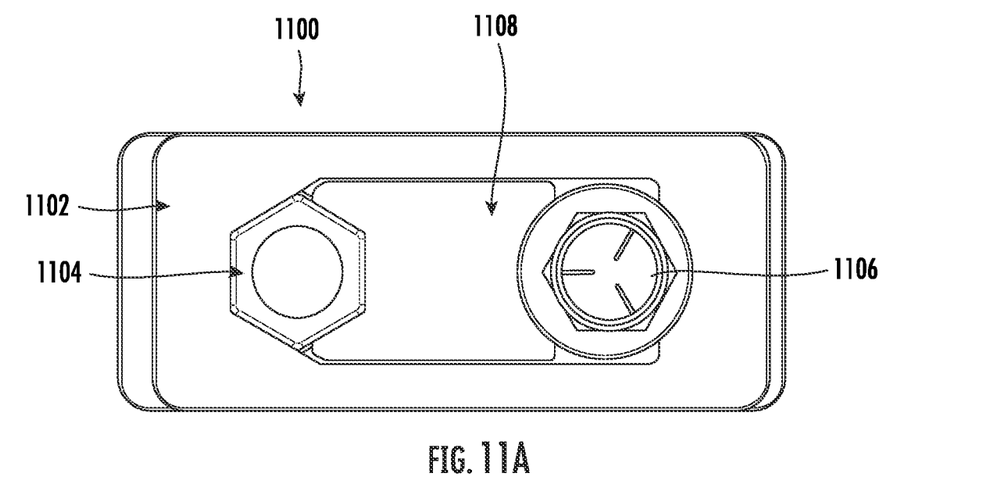
FIG. 11A illustrates an exemplary top view of an axle lock assembly for a shaft having a points-up configuration, according to one or more embodiments described herein.
Figure 11B:
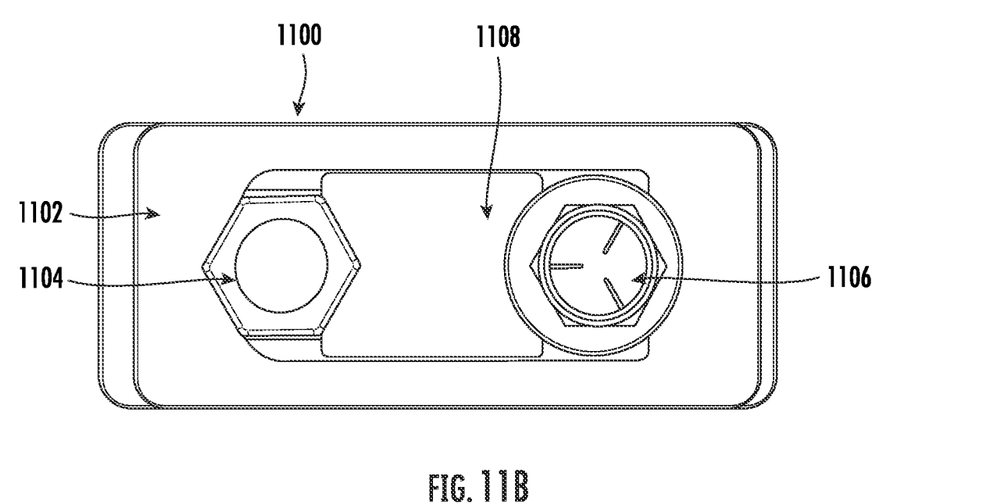
FIG. 11B illustrates an exemplary top view of an axle lock assembly for a shaft having a flats-up configuration, according to a one or more embodiments described herein.

FIGS. 11A and 11B illustrate an exemplary top view of an axle lock assembly 1100 for a shaft having a points-up configuration and a flats-up configuration respectively, according to one or more embodiments described herein. The axle lock assembly 1100 can comprise a first plate 1102, a second plate 1108, a hexagonal roller shaft 1104, and a bush 1106.

Figure 12A:
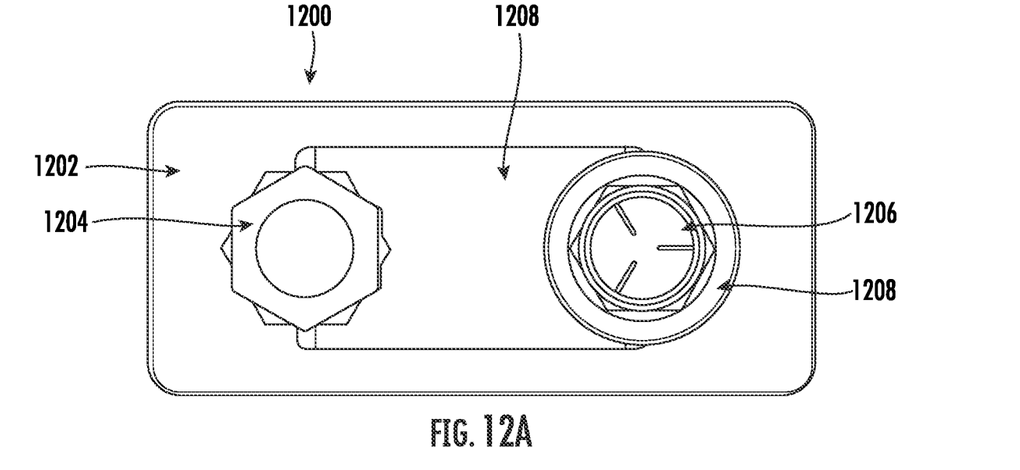
FIG. 12A illustrates an exemplary top view of an axle lock assembly for a shaft having a points-up configuration, according to a one or more embodiments described herein.
Figure 12B:
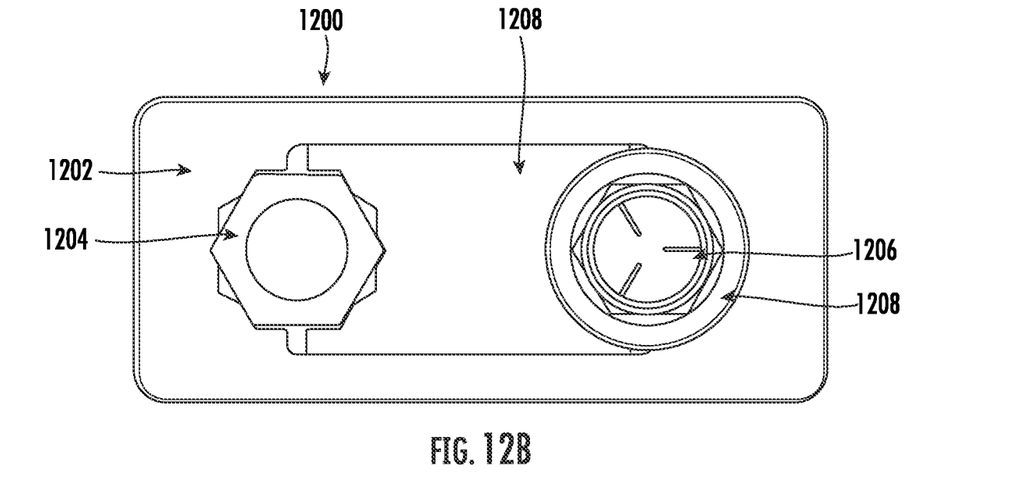
FIG. 12B illustrates an exemplary top view of an axle lock assembly for a shaft having a flats-up configuration, according to a one or more embodiments described herein.

FIGS. 12A and 12B illustrate an exemplary top view of an axle lock assembly 1200 for a shaft having a points-up configuration and a flats-up configuration respectively, according to one or more embodiments described herein. The axle lock assembly 1200 can comprise a first plate 1202, a second plate 1208, a hexagonal roller shaft 1204, and a bush 1208. The bush 1208 can further comprise a bolt 1206 which can drive the bush 1208 to be inserted between the first plate 1202 and the second plate 1208. As shown in FIGS. 12A and 12B, one or more guiding features can be defined in the first plate 1202 and the second plate 1208 such that the hexagonal roller shaft 1204 can be used in both the points-up configuration and the flats-up configuration.

Figure 13A:
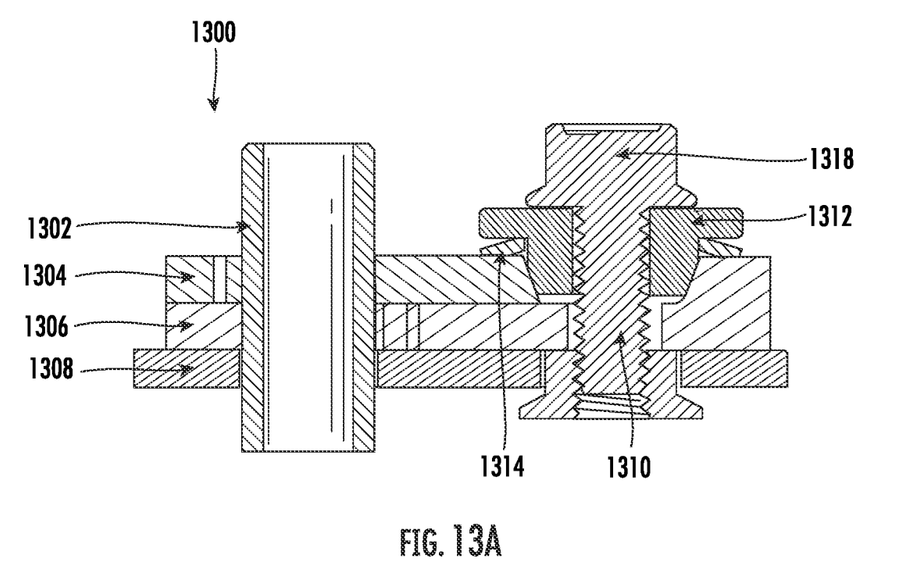
FIG. 13A illustrates an exemplary cross-sectional view of an axle lock assembly, according to a fifth embodiment described herein.
Figure 13B:
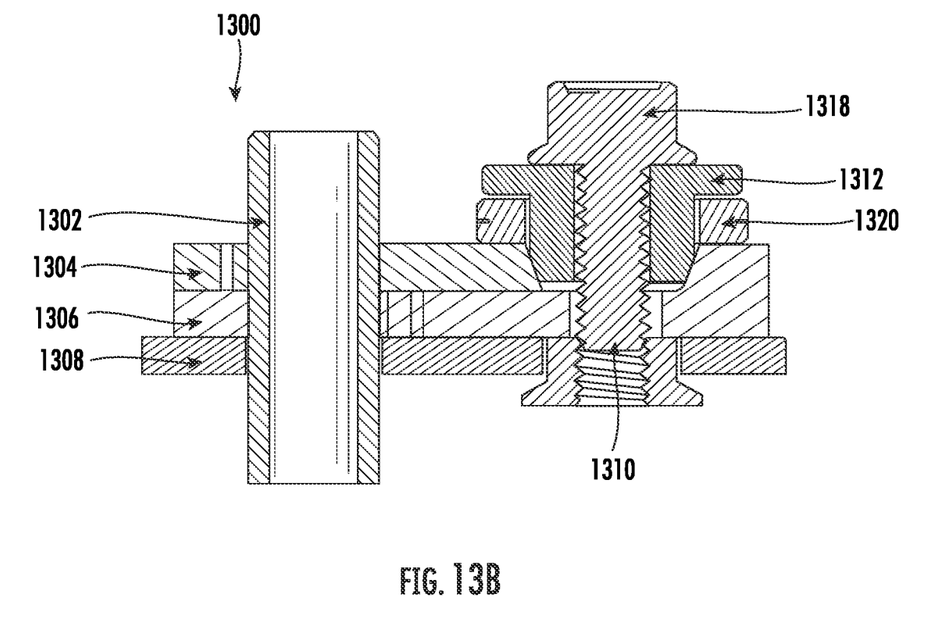
FIG. 13B illustrates an exemplary cross-sectional view of an axle lock assembly, according to a sixth embodiment described herein.

FIGS. 13A and 13B illustrate yet other embodiments of an axle lock assembly 1300, wherein the axle lock assembly 1300 can further comprise a first plate 1304, a second plate 1306, and a bush 1312. The bush 1312 can further comprise a bolt 1318 which can drive the bush 1312 to be inserted between the first plate 1304 and the second plate 1306. In some embodiments. as shown in FIG. 13A, a BelleVille washer 1314 can be used to provide additional support to the bush 1312. In yet some other embodiments, as shown in FIG. 13B, a tension or spring washer 1320 can be used to provide additional support to the bush 1312.

Figure 14:
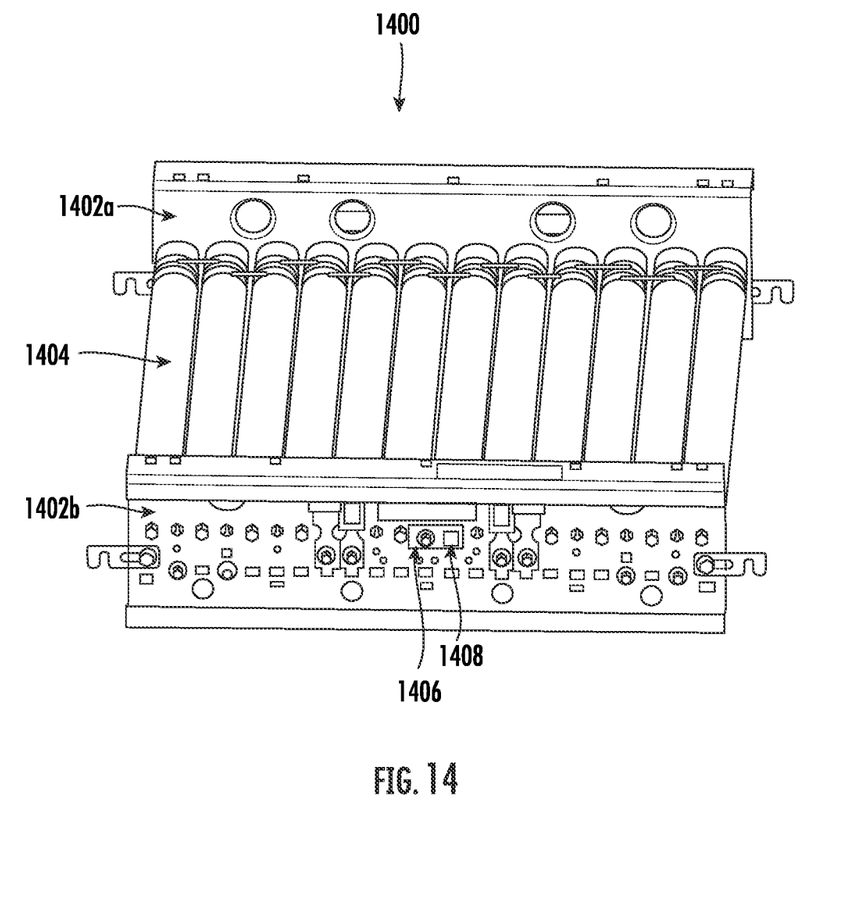
FIG. 14 illustrates an exemplary perspective view of a conveyor frame having a roller bed to which the axle lock assembly is attached.

FIG. 14 illustrates an exemplary perspective view of a warehouse environment 1400 comprising a conveyor frame having a roller bed 1404 to which an axle lock assembly 1406 as described herein is attached. The conveyor frame can comprise side-rails such as 1402a and 1402b. Each of the side-rails 1402a and 1402b can further comprise a plurality of apertures through which roller-shafts such as 1408 can protrude. The roller-shafts such as 1408 can be used to mount motorized or idler rollers, wherein the motorized or idler rollers form a part of the roller-bed 1404. To ensure there is no relative movement between the roller shafts such as 1408 and the motorized or idler rollers, the axle lock assembly 1406 as described herein can be attached to the roller shafts such as 1408.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. An axle lock assembly comprising:
    a first plate with a first aperture;
    a second plate with a second aperture;
    a shaft, wherein the shaft is inserted through the first aperture and the second aperture; and
    a bush, wherein the bush is in contact with the first plate and the second plate and creates a lateral force to move the first plate and the second plate in opposite directions to secure the shaft.

2. The axle lock assembly of claim 1, wherein the axle lock assembly is attached to one end of a roller conveyor to secure the roller conveyor to a conveyor frame.

3. The axle lock assembly of claim 2, wherein a fastener couples the axle lock assembly to the conveyor frame, and wherein the fastener comprises a nut and a bolt.

4. The axle lock assembly of claim 3, wherein the bush comprises a third aperture through which the bolt is inserted, such that the bolt passes through the third aperture of the bush, the first aperture of the first plate, and the second aperture of the second plate respectively.

5. The axle lock assembly of claim 3, wherein the nut of the fastener is in contact with a surface of the conveyor frame and is used to secure the bolt.

6. The axle lock assembly of claim 3, wherein the second plate further comprises an opening in which a magnet is inserted to hold the second plate in place on a surface of the conveyor frame.

7. The axle lock assembly of claim 1, wherein the bush is conical in shape.

8. The axle lock assembly of claim 1, wherein the bush is in contact with the first plate and the second plate in such a manner that the bush, the first plate, and the second plate share a common plane.

9. The axle lock assembly of claim 1, wherein the bush creates an equal and opposite lateral force on the first plate and the second plate to secure the shaft.

10. The axle lock assembly of claim 2, wherein the shaft and a connector the roller conveyor inserted through the first aperture and the second aperture.

11. The axle lock assembly of claim 2, wherein a first surface of the second plate comprises a plurality of projections to grip a surface of the conveyor frame.

12. The axle lock assembly of claim 1, wherein the first plate and the second plate have one or more guiding features to hold the first plate and the second plate in place with respect to each other.

13. An axle lock assembly for securing one end of a conveyor roller to a conveyor frame comprising:
    a first plate with a first aperture, wherein a first shaft insert having a first hexagonal opening is fitted in the first aperture;
    a second plate with a second aperture, wherein a second shaft insert having a second hexagonal opening is fitted in the second aperture;
    a base plate with a base aperture;
    a shaft, wherein the shaft is in a first configuration when inserted through the first hexagonal opening, the second hexagonal opening, and the base aperture, and wherein the shaft is in a second configuration when the first shaft insert and the second shaft insert are rotated before inserting the shaft; and
    a bush, wherein the bush is in contact with the first plate and the second plate and creates a lateral force to move the first plate and the second plate in opposite directions to secure the shaft.

14. The axle lock assembly of claim 13, wherein the first configuration and the second configuration of the shaft comprise one of a flats-up configuration or a points-up configuration.

15. The support of claim 13, wherein the first plate slides in a first direction and the second plate slides in a second direction opposite to the first direction to secure the one end of the conveyor frame.

16. The axle lock assembly of claim 13, wherein an axis of the first aperture of the first plate is partially offset from the second aperture of the second plate by an offset distance.

17. The axle lock assembly of claim 13, wherein an extent of lateral movement of the first plate in the first direction and the second plate in the second direction is based on the offset distance between the first aperture and the second aperture.

18. A method of securing an axle of a conveyor roller to a sidewall of a conveyor frame, said method comprising:
    attaching a support to one end of an axle protruding from the sidewall of the conveyor frame, wherein the support comprises a top plate having a first top aperture, a base plate having a first base aperture, and a bush;
    inserting the bush through the first top aperture of the top plate and the first base aperture of the base plate to create a lateral force to move the top plate and the base plate in opposite directions;
    inserting a top insert into a second top aperture in the top plate and a base insert into a second base aperture in the base plate;
    inserting a shaft through the second top aperture in the top plate and the second base aperture in the base plate;
    fastening the support to the sidewall of the conveyor frame.

19. The method of claim 18, wherein the base plate further comprises an opening in which a magnet is inserted to hold the support in place on a surface of the conveyor frame.

20. The method of claim 18, Wherein the bush integrated with a flange, wherein the flange is in contact with the top plate and the base plate.

* * * * *